(12) United States Patent
Kim et al.

(10) Patent No.: US 8,755,369 B2
(45) Date of Patent: Jun. 17, 2014

(54) SYNCHRONIZATION APPARATUS AND METHOD IN WIRELESS NETWORK SYSTEMS

(75) Inventors: Jihyung Kim, Daejeon (KR); Jung Hyun Kim, Daejeon (KR); Kwang Jae Lim, Daejeon (KR); Dong Seung Kwon, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 241 days.

(21) Appl. No.: 13/467,213

(22) Filed: May 9, 2012

(65) Prior Publication Data

US 2012/0287919 A1      Nov. 15, 2012

(30) Foreign Application Priority Data

May 11, 2011  (KR) .................. 10-2011-0044231

(51) Int. Cl.
*H04J 3/06* (2006.01)
*G06F 11/00* (2006.01)
*H04L 12/28* (2006.01)

(52) U.S. Cl.
USPC ............................ 370/350; 370/252; 370/400

(58) Field of Classification Search
CPC .......... H04W 56/004; H04W 56/0045; H04W 56/005; H04W 56/0055; H04W 56/006; H04W 56/0065; H04W 56/007; H04W 56/008; H04W 56/0085; H04W 56/009; H04W 56/0095; H04W 56/00; H04W 56/0005; H04W 56/001; H04W 56/0015; H04W 56/002
USPC .................. 370/252, 310–350, 400, 464–465
See application file for complete search history.

(56) References Cited

U.S. PATENT DOCUMENTS

| | | | | |
|---|---|---|---|---|
| 4,905,233 | A  * | 2/1990 | Cain et al. ..................... | 370/237 |
| 7,885,071 | B2 * | 2/2011 | Huang et al. .................. | 361/700 |
| 8,391,271 | B2 * | 3/2013 | Mo et al. ....................... | 370/350 |
| 2011/0063999 | A1 * | 3/2011 | Erdmann et al. ............. | 370/254 |
| 2011/0193719 | A1 * | 8/2011 | Monier .................... | 340/870.02 |
| 2013/0181848 | A1 * | 7/2013 | Picard ..................... | 340/870.03 |

* cited by examiner

*Primary Examiner* — Warner Wong
(74) *Attorney, Agent, or Firm* — H.C. Park & Associates, PLC

(57) ABSTRACT

A node synchronization apparatus in a wireless network system sets a fast Fourier transform (FFT) start point and requests a one-hop neighbor node to change its transmission time. The synchronization apparatus sets a signal receiving time and requests a one-hop neighbor node to change a receiving time. In this way, a node synchronizes signal transmission and signal reception.

20 Claims, 15 Drawing Sheets

SYNCHRONIZATION APPARATUS AND METHOD IN WIRELESS NETWORK SYSTEMS

CROSS-REFERENCE TO RELATED APPLICATION

This application claims priority to and the benefit of Korean Patent Application No. 10-2011-0044231 filed in the Korean Intellectual Property Office on May 11, 2011, the entire contents of which are incorporated herein by reference.

BACKGROUND OF THE INVENTION (a) Field of the Invention

The present invention relates to a synchronization apparatus and method in wireless network systems. More particularly, the present invention relates to a synchronization method in consideration of a propagation delay depending on a distance between nodes when respective nodes have different clock values and when inter-node distances are different from one another.

(b) Description of the Related Art

A wireless network system mostly uses a method of performing synchronization with a node that transmits a beacon using time information of the node.

This synchronization method is based on the case in which each node is located within an allowed range, that is, inter-node distances are similar or a small propagation delay is present. Accordingly, there is a need for a synchronization scheme considering a propagation delay depending on a distance between nodes in the case where nodes are arranged at different distances among them, and a difference between clock values of nodes in case of distributed topology. In addition, a synchronization method in the case where orthogonal frequency division multiplexing (OFDM) is applied has not yet been defined, and thus this synchronization method is also needed.

SUMMARY OF THE INVENTION

The present invention has been made in an effort to provide a synchronization apparatus and method in wireless network systems having advantages of being applicable when respective nodes have different clock values and when inter-node distances are different from one another.

Another object of the present invention is to provide a synchronization method and apparatus which can be applied when OFDM is used.

According to an exemplary embodiment of the present invention, a method for synchronizing receiving time of a node in a wireless network system is provided. The synchronization method includes estimating propagation delays between the node and a plurality of neighbor nodes corresponding to one hop of the node, and requesting at least one of a neighbor node having a minimum propagation delay and a neighbor node having a maximum propagation delay to change its signal transmission time.

The requesting of the at least one neighbor node may include requesting the at least one neighbor node to change its signal transmission time when a difference between the maximum propagation delay and the minimum propagation delay is greater than the length of a cycle prefix (CP) of one symbol.

The requesting of the at least one neighbor node may include requesting the neighbor node having the minimum propagation delay to delay its signal transmission time.

The requesting of the at least one neighbor node may include requesting the neighbor node having the maximum propagation delay to advance its signal transmission time.

The requesting of the at least one neighbor node may include requesting the neighbor node having the minimum propagation delay to delay its signal transmission time, and requesting the neighbor node having the maximum propagation delay to advance its signal transmission time.

The requesting of the at least one neighbor node may include checking whether a fast Fourier transform (FFT) start point is present within a range between the maximum propagation delay and the minimum propagation delay, excluding the at least one of a neighbor node having a minimum propagation delay and a neighbor node having a maximum propagation delay from among the plurality of neighbor nodes until the FFT start point is present within the range between the maximum propagation delay and the minimum propagation delay when the FFT start point is not present, and requesting the excluded neighbor node to change its signal transmission time.

The synchronization method may further include measuring the amount of interference for a predetermined time when the at least one neighbor node rejects the transmission time change request, and forcibly instructing the at least one neighbor node to change its signal transmission time when the measured amount of interference exceeds a predetermined reference value.

The estimating of the propagation delays may include calculating round trip delays between the specific node and the plurality of neighbor nodes through a ranging procedure with the plurality of neighbor nodes, and estimating the propagation delays from the round trip delays.

According to another exemplary embodiment of the present invention, a method for synchronizing transmission time of a node in a wireless network system is provided.

The synchronization method includes estimating propagation delays between the node and a plurality of neighbor nodes corresponding to one hop of the node, and requesting at least one of a neighbor node having a minimum propagation delay and a neighbor node having a maximum propagation delay to change its signal receiving time.

The requesting of the at least one neighbor node may include requesting the neighbor node having the minimum propagation delay to delay its signal receiving time, and requesting the neighbor node having the maximum propagation delay to advance its signal receiving time.

The requesting of the at least one neighbor node may include checking whether a transmission start point is present within a range between the maximum propagation delay and the minimum propagation delay, excluding at least one of a neighbor node having a minimum propagation delay and a neighbor node having a maximum propagation delay from among the plurality of neighbor nodes until the transmission start point is present within the range between the maximum propagation delay and the minimum propagation delay when the FFT start point is not present, and requesting an excluded neighbor node to change its signal receiving time.

According to another exemplary embodiment, an apparatus for synchronizing a node in a wireless network system is provided.

The synchronization apparatus includes a delay estimation unit, a reception synchronization unit, and a transmission synchronization unit.

The delay estimation unit estimates propagation delays between the node and a plurality of neighbor nodes corresponding to one hop of the node.

The reception synchronization unit requests at least one of a neighbor node having a minimum propagation delay and a neighbor node having a maximum propagation delay to change its signal transmission time using the propagation delays of the plurality of neighbor nodes.

The transmission synchronization unit requests at least one of a neighbor node having a minimum propagation delay and a neighbor node having a maximum propagation delay to change its signal receiving time using the propagation delays of the plurality of neighbor nodes

DETAILED DESCRIPTION OF THE EMBODIMENTS

Figure 1:
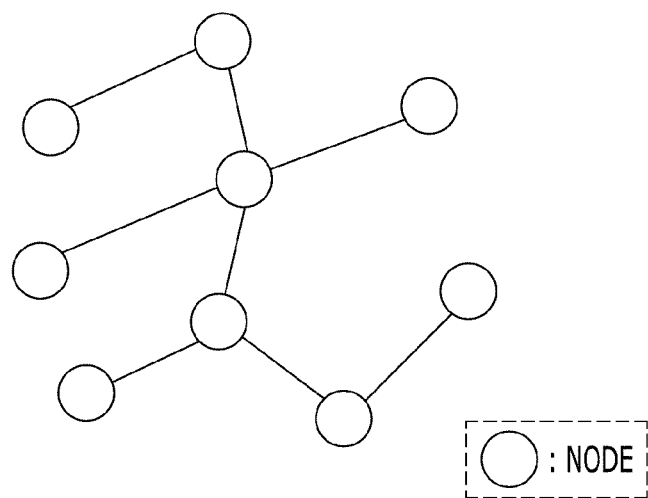
FIG. 1 illustrates a wireless network system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the overall specification and claims, unless explicitly described to the contrary, the word "comprise" and variations such as "comprises" or "comprising" will be understood to imply the inclusion of stated elements but not the exclusion of any other elements.

A synchronization apparatus and method in a wireless network system according to exemplary embodiments of the present invention will be explained in detail with reference to the attached drawings.

FIG. 1 illustrates a wireless network system according to an exemplary embodiment of the present invention;

The wireless network system according to an exemplary embodiment of the present invention is a network system in which communication is performed between nodes that construct a network, such as a wireless mesh network or a mobile ad-hoc network.

FIG. 1 shows an ad-hoc network in which a plurality of nodes perform multihop communication as a wireless network system to which an exemplary embodiment of the present invention is applied.

Referring to FIG. 1, the ad-hoc network may include a plurality of nodes. Each node can perform communication with a neighbor node. A neighbor node means a node located in proximity to each node. A logical link may be established between each node and a neighbor node and data may be exchanged through the link.

Each node can communicated with a neighbor node using OFDM, and also communicate with a neighbor node using orthogonal frequency division multiple access (OFDMA) in which a plurality of nodes share subcarriers in OFDM.

Figure 2:
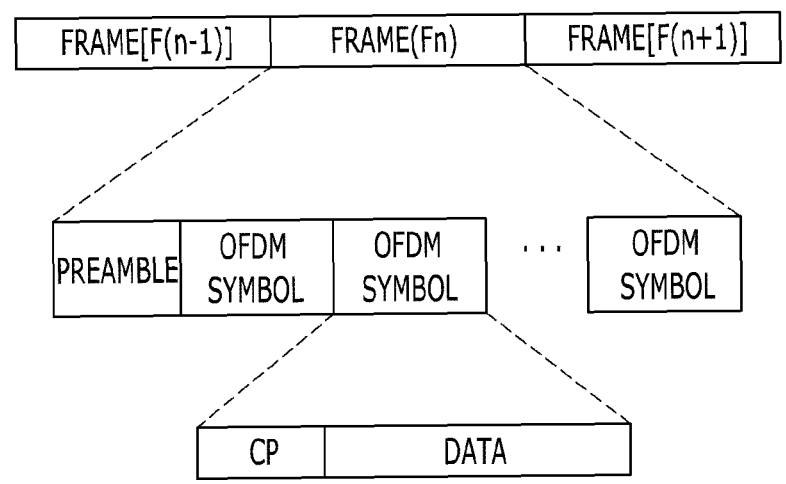
FIG. 2 shows a frame structure according to an exemplary embodiment of the present invention.
Figure 3:
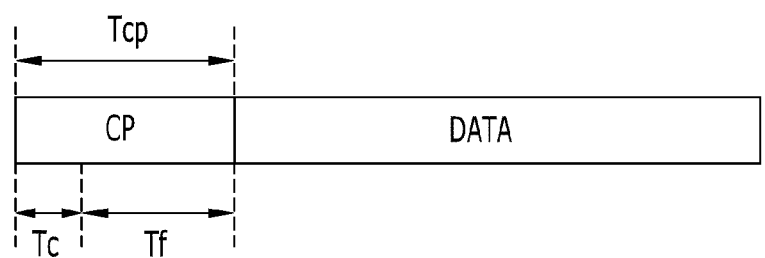
FIG. 3 shows an OFDM symbol structure.
Figure 4:
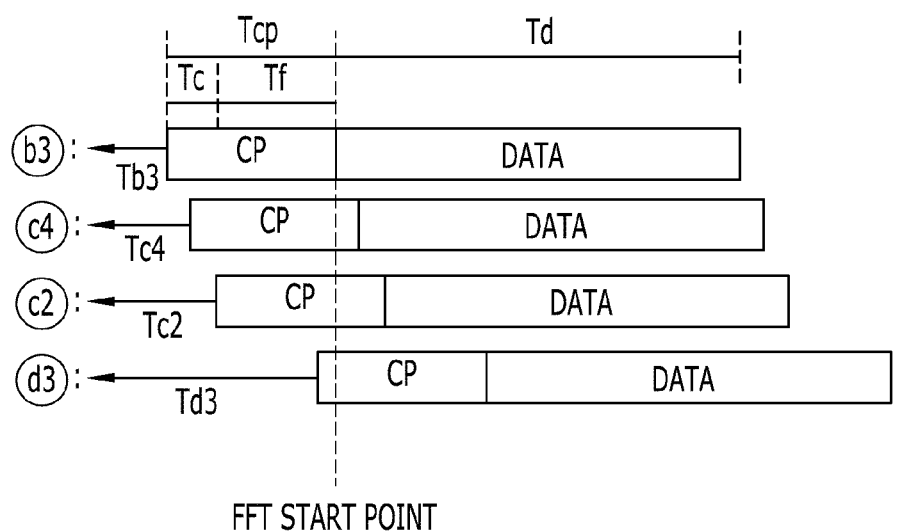
FIG. 4 illustrates a method of setting an FFT start point according to an exemplary embodiment of the present invention.

FIG. 2 shows a frame structure according to an exemplary embodiment of the present invention, and FIG. 3 shows an OFDM symbol structure. FIG. 4 illustrates a method of setting an FFT start point according to an exemplary embodiment of the present invention.

The nodes constructing the wireless network can communicate using a frame shown in FIG. 2.

Referring to FIG. 2, one frame includes a preamble and a plurality of OFDM symbols.

The preamble is located at the head of the frame, and may include a short training sequence and a long training sequence having a repetitive characteristic.

Each OFDM symbol includes a cycle prefix (CP) that copies the latter half of each OFDM symbol, and data.

Referring to FIG. 3, the CP functions as a guard interval for inter-symbol interference (ISI) between two continuous OFDM symbols or inter-carrier interference (ICI).

A CP period Tcp includes a channel period Tc and a free ICI period Tf. Tcp represents the length of the CP period, and Tc and Tf respectively denote the lengths of the channel period and free ICI period.

In OFDM, a receiving node that receives a signal performs fast Fourier transform (FFT) to transform a time-domain signal into a frequency-domain signal. The receiving node may perform discrete Fourier transform (DFT) to transform a time-domain signal into a frequency-domain signal.

When FFT is performed, an FFT start point corresponds to the end point of the CP period Tcp, as shown in FIG. 3. However, even if the FFT start point is set in the free ICI period Tf due to the CP, signal recovery is not affected by interference since correction according to channel estimation is performed. In other words, even when the FFT start point is set in the free ICI period Tf, inter-subcarrier orthogonality in the frequency domain, which is a property of OFDM, is maintained.

When the FFT start point is set in the channel period Tc of the CP period Tcp, a previous symbol is subjected to ISI due to a multipath characteristic of a channel so as to generate ICI. However, the influence of the ICI is insignificant.

However, when the FFT start point is set out of the CP period Tcp, ICI is generated due to ISI of a previous symbol or the following symbol and the influence of the ICI may become serious. In other words, when the FFT start point is set out of the CP period Tcp, inter-subcarrier orthogonality in the frequency domain is not maintained.

For example, if a receiving node that receives signals from a plurality of transmission nodes b3, c4, c2, and d3 using different subcarriers in OFDMA sets an FFT start point, as shown in FIG. 4, inter-subcarrier orthogonality is maintained for the signals of the transmission nodes b3, c4, and c2 and thus the signals do not affect other subcarriers because the FFT start point is set in free ICI periods Tf of the signals of the transmission nodes b3, c4, and c2. Since the FFT start point is set in a channel period Tc of the signal of the transmission node d3, other subcarriers are affected by ICI. However, since the FFT start point belong to a CP period Tcp of the signal, the influence of ICI is insignificant.

In other words, the FFT start point needs to be set in the free ICI periods Tf of all the transmission nodes on the basis of one of the transmission nodes in order to allow the receiving node to receive the signals of all the transmission nodes without interference. In addition, to alleviate interference applied to the receiving node, the signals of all the transmission nodes must be received in the CP period Tcp of one transmission node.

That is, when the receiving node sets the start point of the signal of a transmission node (for example, b3), which is the first signal arrived at the receiving node, as the FFT start point, the receiving node is subjected to no interference or less interference only when a condition that a difference between a time Tb3 when the signal from the transmission node b3 is received and a time Td3 when the signal from the transmission node d3, which is the last signal arrived at the receiving node, is received is shorter than the length of the free ICI period Tf or the length of the CP period Tcp is satisfied.

Next a detailed description will be given of a method for synchronizing nodes in a wireless network system using OFDM or OFDMA reference to FIGS. 5 to 15.

Figure 5:
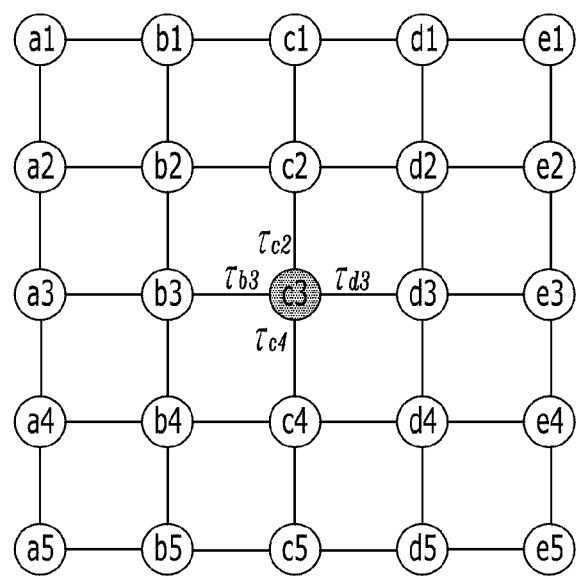
FIG. 5 illustrates a topology configuration of a wireless network system according to an exemplary embodiment of the present invention.
Figure 6:
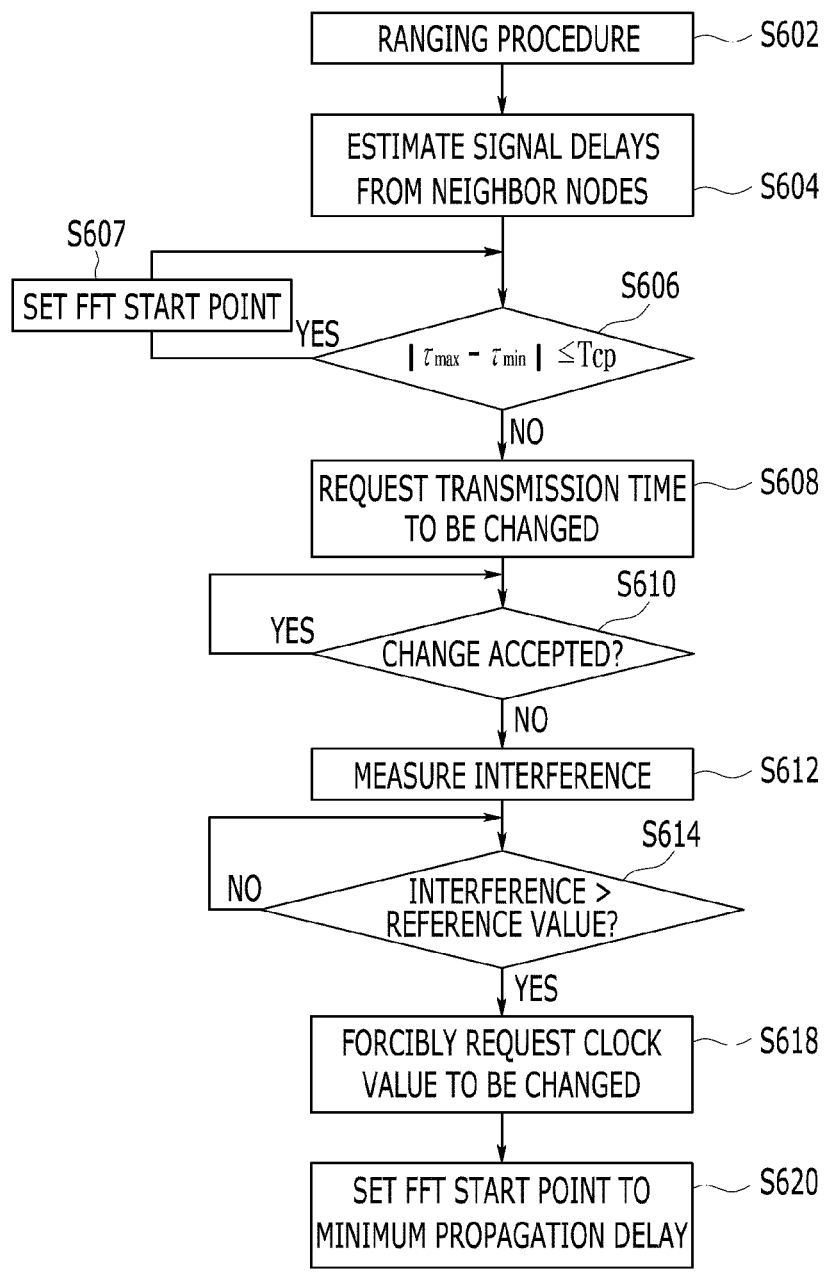
FIG. 6 is a flowchart illustrating a synchronization method in a wireless network system according to a first exemplary embodiment of the present invention.

FIG. 5 illustrates a topology configuration of a wireless network system according to an exemplary embodiment of the present invention, and FIG. 6 is a flowchart illustrating a synchronization method in a wireless network system according to a first exemplary embodiment of the present invention.

Under the condition that the nodes that construct the wireless network system are synchronized on the basis of the above description, a method for synchronizing the nodes when the node c3 enters the network to construct a network topology as shown in FIG. 5 is described.

This method corresponds to a method that is periodically performed by the nodes constructing the wireless network system for synchronization.

Referring to FIG. 5, distances between the node c3 that has entered the network and neighbor nodes c2, b3, c4, and d3 are different from one another, and thus the node c3 may have different propagation delays $\tau_{c2}$, $\tau_{b3}$, $\tau_{d3}$ and $\tau_{c4}$ between the node c3 and the respective neighbor nodes c2, b3, c4, and d3. The neighbor nodes c2, b3, c4, and d3 perform one-hop communication.

Referring to FIG. 6, the node c3 acquires network information transmitted from the respective nodes in a power-on state. Furthermore, the node c3 performs a ranging procedure with the neighbor nodes c2, b3, c4, and d3 to find a ranging signal transmission period (S602), and estimates the propagation delays $\tau_{c2}$, $\tau_{b3}$, $\tau_{d3}$, and $\tau_{c4}$ depending on the distances between the node c3 and the neighbor nodes c2, b3, c4, and d3 through the ranging procedure (S604).

If there is a sponsor node that administrates the node c3, the node c3 may synchronize its clock value with that of the sponsor node or a minimum propagation delay to set a clock value for a receiving time.

Since a time required to receive a signal from a neighbor node increases if a propagation delay for the neighbor node is large, the propagation delays $\tau_{c2}$, $\tau_{b3}$, $\tau_{d3}$, and $\tau_{c4}$ may be considered to respectively correspond to instants of time when the signals are received from the neighbor nodes c2, b3, c4, and d3.

The node c3 checks whether the condition of Equation 1 is satisfied using the propagation delays $\tau_{c2}$, $\tau_{b3}$, $\tau_{d3}$, and $\tau_{c4}$ with respect to the neighbor nodes c2, b3, c4, and d3 (S606).

$$|\tau_{max} - \tau_{min}| \leq Tcp \quad \text{[Equation 1]}$$

Here, $\tau_{max}$ represents a maximum value (for example, $\tau_{d3}$) from among propagation delays of one-hop node (for example, the neighbor nodes c2, b3, c4, and d3) and $\tau_{min}$ represents a minimum value (for example, $\tau_{b3}$) of the one-hop node (for example, neighbor nodes c2, b3, c4, and d3).

When Equation 1 is satisfied, that is, when a difference between the maximum propagation delay $\tau_{max}$ and the minimum propagation delay $\tau_{max} \tau_{min}$ belongs to Tcp, the node c3 may receive all the signals of the neighbor nodes c2, b3, c4, and d4 without being largely affected by interference.

If Equation 1 is satisfied, Equation 2 can be established.

$$\tau_{min} \leq FFT_{c3} \leq \tau_{max} \quad \text{[Equation 2]}$$

Here, $FFT_{c3}$ denotes an FFT start point.

The node c3 sets the FFT start point $FFT_{c3}$ to a value closest to an FFT start reference point between the maximum propagation delay $\tau_{max}$ and the minimum propagation delay $\tau_{min}$ (S607). The FFT start reference point of the node c3 may be predetermined, and an initial value of the FFT start reference point of the node c3 may be determined by a system initial parameter.

When Equation 1 is not satisfied, that is, when the difference between the maximum propagation delay $\tau_{max}$ and the minimum propagation delay $\tau_{max} \tau_{min}$ from among the propagation delays $\tau_{c2}$, $\tau_{b3}$, $\tau_{d3}$, and $\tau_{c4}$ for the neighbor nodes c2, b3, c4, and d3 is greater than Tcp, the node c3 requests the node d3 having the maximum propagation delay $\tau_{max}$ or the node b3 having the minimum propagation delay $\tau_{min}$ to change its signal transmission time (S608).

To request one of the neighbor nodes c2, b3, c4, and d3 to adjust its signal transmission time, the node c3 needs to know propagation delays of the neighbor nodes c2, b3, c4, and d3 for one-hop nodes of the neighbor nodes c2, b3, c4, and d3. That is, the node c3 needs to know propagation delays between the neighbor node c2 and nodes c1, b2, and d2 except the node c3, propagation delays between the neighbor node b3 and nodes b2, a3, and b4 except the node c3, propagation delays between the neighbor node c4 and nodes b4, c5, and d4 except the node c3, and propagation delays between the neighbor node d3 and nodes d2, d4, and e3 except the node c3. The node c3 may be aware of the propagation delays for the one-hop nodes of the neighbor nodes c2, b3, c4, and d3 by receiving the propagation delays for the one-hop nodes of the neighbor nodes c2, b3, c4, and d3.

Upon acquisition of the propagation delays for the one-hop nodes of the neighbor nodes c2, b3, c4, and d3, the node c3 may request the neighbor node d3 having the maximum propagation delay $\tau_{max}$ from among the propagation delays $\tau_{c2}$, $\tau_{b3}$, $\tau_{d3}$, and $\tau_{c4}$ for the neighbor nodes c2, b3, c4, and d3 or the neighbor node b3 having the minimum propagation delay $\tau_{min}$ to change its signal transmission time.

The neighbor node d3 or b3 requested by the node c3 to change the signal transmission time may accept the request and change the signal transmission time or reject the request.

When the neighbor node d3 or b3 rejects the transmission time change request (610), the node c3 receives interference of a previous symbol or the following symbol.

When the neighbor node d3 or b3 rejects the transmission time change request (S610), the node c3 measures the amount of interference for a predetermined time (S612). When the measured amount of interference is greater than a predetermined reference value (S614), the node c3 forcibly requests the neighbor node d3 or b3 to change its clock value corresponding to the signal transmission time to an arbitrary value (S616).

At this time, the nodes of the wireless network system may conform to one of a method of reducing the maximum propagation delay and a method of increasing the minimum propagation delay, or a method of reducing the maximum propagation delay and simultaneously increasing the minimum propagation delay.

The neighbor node d3 or b3 forcibly requested by the node c3 to change its clock value corresponding to the signal transmission time changes the clock value to the arbitrary value.

When the clock value corresponding to the transmission time of the neighbor node d3 or b3 is changed, and thus interference is generated for one-hop nodes of the neighbor node d3 or b3, the neighbor node d3 or b3 selects a node having a clock value to be changed from the one-hop nodes and requests the selected node to change the clock value.

In the case where the clock value of the one-hop node of the neighbor node having the changed clock value is varied in this manner, if interference is generated in the one-hop node of the neighbor node, the one-hop node of the neighbor node performs the above-mentioned steps S608 to S618 performed by the node c3.

As described above, the node c3 may set a receiving point by changing the transmission time of the neighbor nodes c2, b3, c4, and d3.

Interference generated at the node c3 is moved to regions around the node c3, and thus inter-node interference can be adjusted after the lapse of a predetermined time according to the above-repeated process to remove the interference.

Then, the node c3 sets the FFT start point to the minimum propagation delay $\tau_{min}$ using the propagation delays $\tau_{c2}$, $\tau_{b3}$, $\tau_{d3}$, and $\tau_{c4}$ of the neighbor nodes c2, b3, c4, and d3 (S620).

The propagation delays $\tau_{c2}$, $\tau_{b3}$, $\tau_{d3}$, and $\tau_{c4}$ for the neighbor nodes c2, b3, c4, and d3 may be considered to respectively correspond to instants of time when the neighbor nodes c2, b3, c4, and d3 receive a signal transmitted from the node c3.

The node c3 sets the FFT start point using the propagation delays $\tau_{c2}$, $\tau_{b3}$, $\tau_{d3}$, and $\tau_{c4}$ from the one-hop neighbor nodes c2, b3, c4, and d3 such that the neighbor node c2, b3, c4, and d3 can respectively receive a signal from the node c3 within the CP period Tcp.

Figure 7:
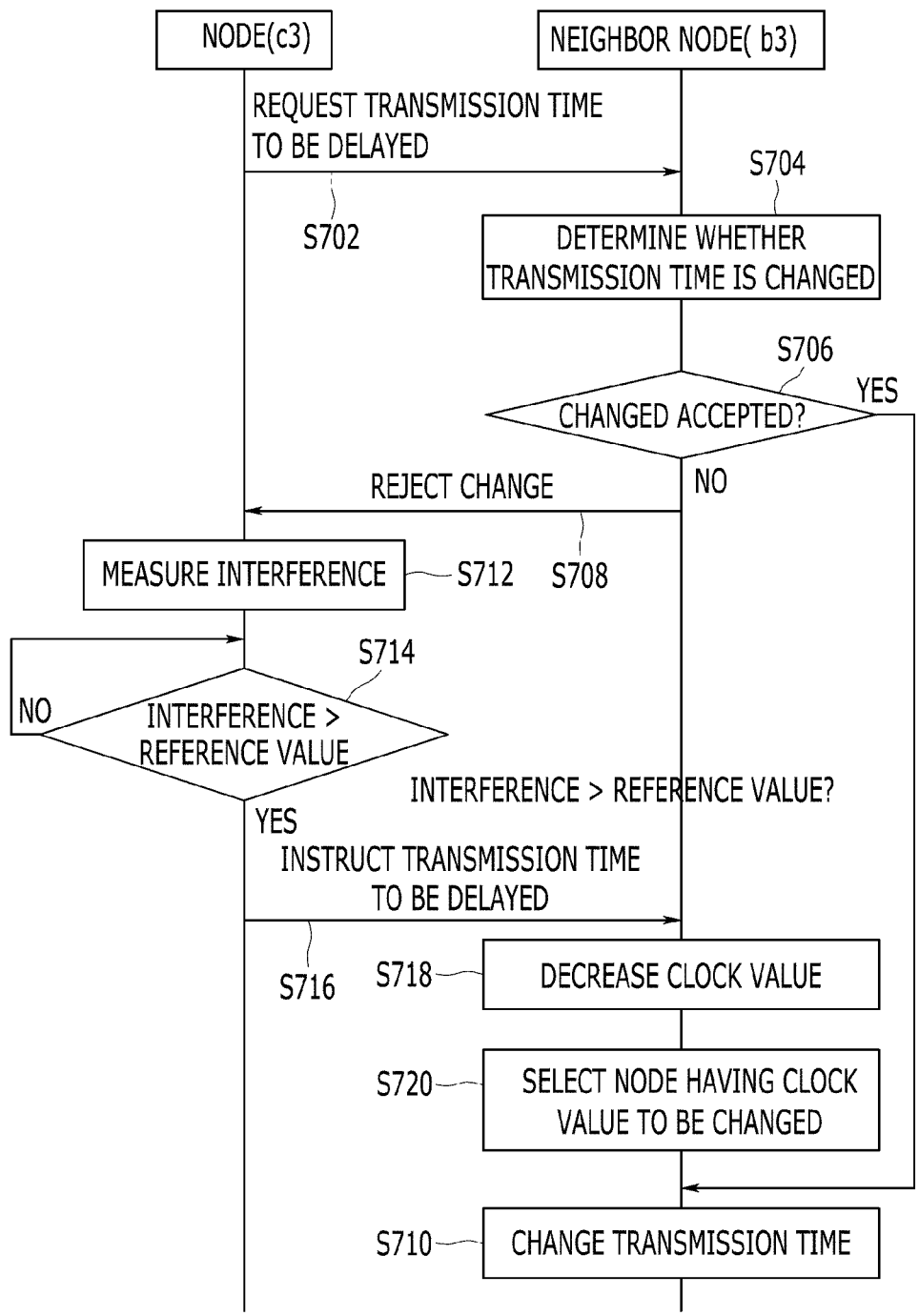
FIGS. 7 and 8 are flowcharts illustrating a procedure of changing a transmission time according to first and second exemplary embodiments of the present invention, respectively.
Figure 8:
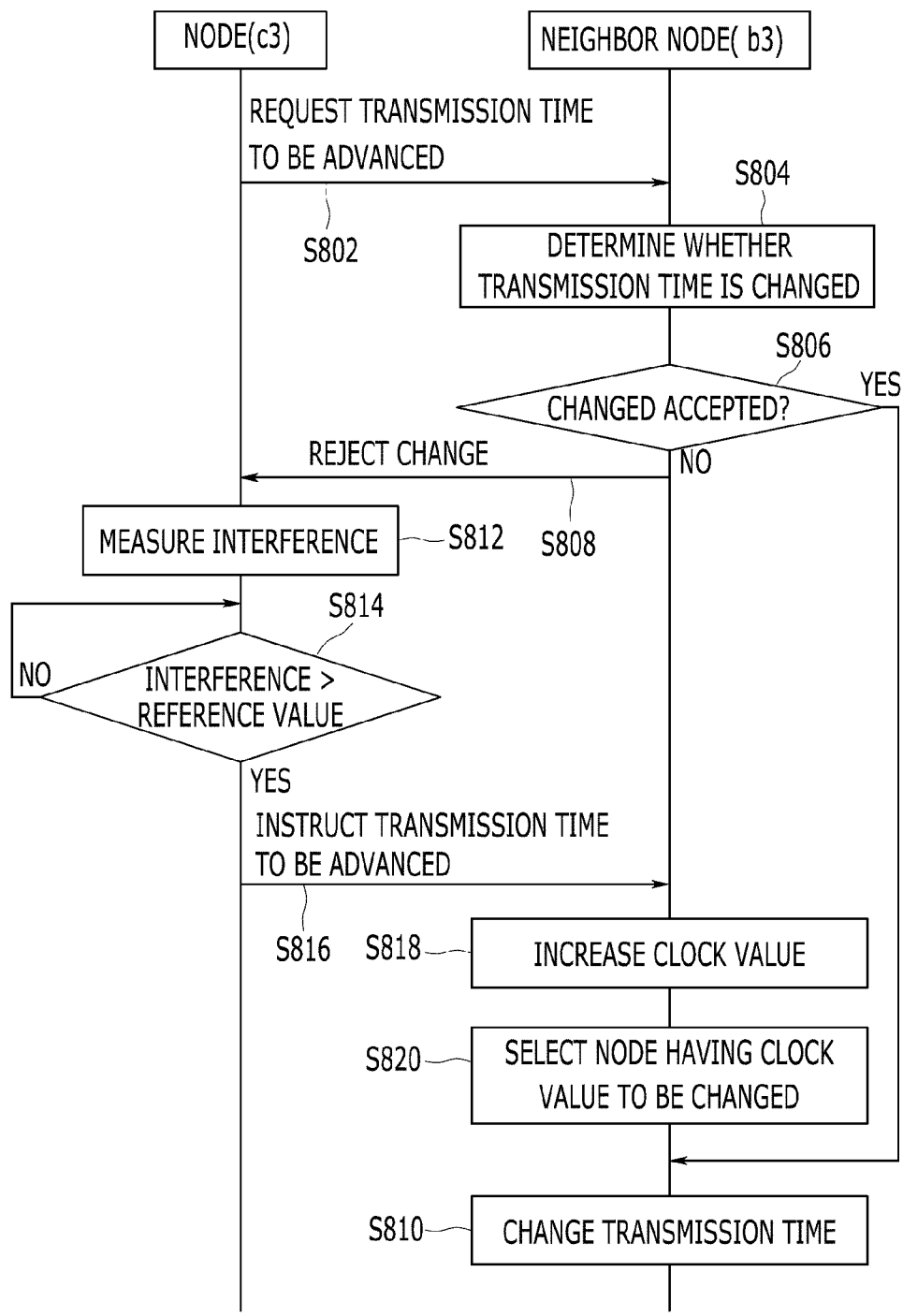

FIGS. 7 and 8 are flowcharts respectively illustrating operations of changing a transmission time according to first and second exemplary embodiments of the present invention.

Referring to FIG. 7, the node c3 may request the neighbor node b3 having the minimum propagation value $\tau_{min}$ to delay its signal transmission time (S702). When the neighbor node b3 delays the transmission time and transmits a signal at the delayed transmission time, the difference between the maximum propagation delay $\tau_{max}$ and the minimum propagation delay $\tau_{min}$ may be shorter than Tcp.

The neighbor node b3 requested by the node c3 to delay its signal transmission time determines change of the transmission time on the basis of states of one-hop neighbor nodes b2, a3, and b4 thereof (S704).

The neighbor node b3 may reject the transmission time change request if ISI and ICI are generated from at least one of the nodes b2, a3, and b4 when the neighbor node b3 transmits a signal at the delayed transmission time. That is, the neighbor node b3 does not change the signal transmission time if a difference between propagation delays between the neighbor node b3 and the nodes b2, a3, and b4 does not satisfy Equation 1 when the neighbor node b3 transmits a signal at the delayed transmission time.

On the contrary, the neighbor node b3 may determine its signal transmission time to be delayed (S706) and change the transmission time (S710) if ISI and ICI are not generated from the nodes b2, a3, and b4 or influence of the ISI and ICI is not significant.

When the neighbor node b3 rejects the transmission time change request (S706 and S708), the node c3 measures the amount of interference for a predetermined time (S712). When the amount of interference, measured for the predetermined time, is greater than a predetermined reference value (S714), the node c3 forcibly instructs the neighbor node b3 to delay the signal transmission time by an arbitrary value (S716). For example, the node c3 can request the neighbor node b3 to decrease its clock value corresponding to the signal transmission time thereof by 1.

After the neighbor node b3 decreases the clock value (S718), the neighbor node b3 selects a node having a clock value to be changed from nodes b2, a3, and b4 corresponding to one-hop nodes thereof (S720).

For example, when a propagation delay between the neighbor node b3 having the clock value that has been changed and the node b2 corresponds to a maximum propagation value among propagation delays between the node b2 and the one-hop nodes b1, a2, b3, and c2 of the node b2, the node b3 determines the clock value of the node b2 to be changed and requests the node b2 to change the clock value. In this case, the node b3 may request the node b2 to change the clock value by the changed clock value of the node b3.

Similarly, when a propagation delay between the neighbor node b3 having the clock value that has been changed and the node b4 corresponds to a maximum propagation value among propagation delays between the node b4 and one-hop nodes b3, a4, b5, and c4 of the node b4, the node b3 determines the clock value of the node b4 to be changed and requests the node b4 to change the clock value. In this case, the node b3 may request the node b3 to change the clock value by the changed clock value of the node b3. It is possible to determine change of the clock value of the node a3 in the same manner.

Referring to FIG. 8, differently from FIG. 7, the node c3 may request the neighbor node d3 having the maximum propagation delay $\tau_{max}$ to advance its signal transmission time (S802). If the neighbor node d3 advances its transmission time and transmits a signal at the advanced transmission time, the difference between the maximum propagation delay $\tau_{max}$ and the minimum propagation delay $\tau_{min}$ can be shorter than Tcp.

The neighbor node d3 requested by the node c3 to advance its signal transmission time determines whether to change the signal transmission time on the basis of states of one-hop nodes d2, e3 and d4 thereof (S804).

The neighbor node d3 may reject the transmission time change request if ISI and ICI are generated from at least one of the one-hop nodes d2, e3, and d4 when the neighbor node d3 advances the signal transmission time and transmits a signal at the advanced transmission time. That is, the neighbor node d3 does not change its signal transmission time if a difference between propagation delays between the node d3 and the nodes d2, e3, and d4 does not satisfy Equation 1 when the neighbor node d3 transmits a signal at the advanced transmission time.

On the other hand, the node d3 may determine that it advances its signal transmission time (S806) and change its signal transmission time (S810) when ISI and ICI are not generated from the nodes d2, e3, and d4 or influence of the ISI and ICI is not significant.

When the neighbor node d3 rejects the transmission time change request (S806 and S808), the node c3 measures interference for a predetermined time. The node c3 forcibly instructs the neighbor node d3 to advance its signal transmission time by an arbitrary value if the interference measured for the predetermined time is greater than a predetermined reference value (S816). For example, the node c3 can request the neighbor node d3 to increase its clock value corresponding to its signal transmission time by 1.

The neighbor node d3 increases the clock value (S818), and then selects a node having a clock value to be changed from one-hop nodes d2, e3, and d4 of the node d3 (S820). For example, when a propagation delay between the neighbor node d3 having the changed clock value and the node d2 corresponds to a minimum propagation delay among propagation delays between the node d2 and one-hop nodes d1, c2, d3, and e2 of the node d2, the node d3 determines the clock value of the node d2 to be changed and requests the node d2 to change the clock value. In this case, the node d3 can request the node d2 to change the clock value by the changed clock value of the node d3.

In the same manner, when a propagation delay between the neighbor node d3 having the changed clock value and the node e3 corresponds to a minimum propagation delay among propagation delays between the node e3 and one-hop nodes e2, d3, and e4 of the node e3, the node d3 determines the clock value of the node e3 to be changed and requests the node e3 to change the clock value. In this case, the node d3 can request the node e3 to change the clock value by the changed clock value of the node d3. It is also possible to determine the clock value of the node d4 to be changed.

Meanwhile, when new nodes are generated simultaneously or at predetermined intervals in a wireless network and a signal transmission time or a clock value corresponding to the signal transmission time is changed, arbitrary nodes can be requested to change their clock values simultaneously. Nodes simultaneously requested to change their clock values change their clock values to a clock value having a minimum change value and do not request neighbor nodes to change their clock signals.

Figure 9:
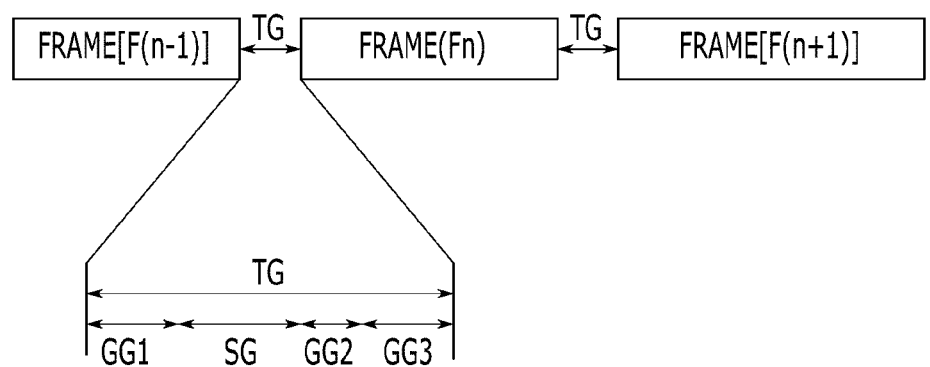
FIG. 9 illustrates a transmission interval between frames according to an exemplary embodiment of the present invention.
Figure 10:
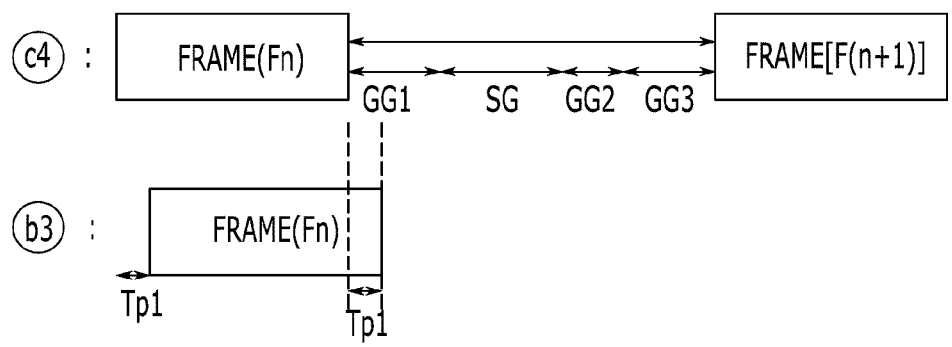
FIGS. 10 and 11 illustrate methods of changing a transmission time according to an exemplary embodiment of the present invention.
Figure 11:
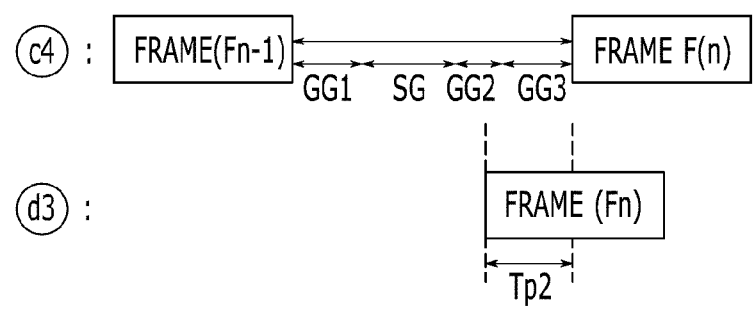

FIG. 9 illustrates a transition gap between frames according to an exemplary embodiment of the present invention, and FIGS. 10 and 11 illustrate a method of changing a transmission time according to an exemplary embodiment of the present invention.

Referring to FIG. 9, a transition gap TG is present between a frame Fn−1 and a frame Fn and between the frame Fn and the next frame F(n+1).

The transition gap TG may include a first guard interval GG1 for transmission time change, a switching interval SG for switching of transmission and reception, and second and third guard intervals GG2 and GG3 for transmission time change. Particularly, the first guard gap interval GG1 is required to delay a transmission time and the second and third guard intervals GG2 and GG3 are required to advance a transmission time.

According to an exemplary embodiment of the present invention, a delay of a signal transmission time needs to be set such that it does not exceed the length of the first guard interval GG1, and an advance of the signal transmission time needs to be set such that it does not exceed the second and third guard intervals GG2 and GG3.

Referring to FIG. 10, the neighbor node b3 requested by the node c3 to delay its signal transmission time by Tp1 delays transmission of a corresponding frame Fn by Tp1 from the transmission of the corresponding frame according to another neighbor node (for example, c4). In this case, the neighbor node b3 may finish the transmission of the frame Fn in the first guard interval GG1 between the frame Fn and the next frame F(n+1).

Referring to FIG. 11, the neighbor node d3 requested by the node c3 to advance its signal transmission time advances transmission of the corresponding frame Fn by Tp2 from the transmission of the corresponding frame according to another neighbor node (for example, c4). In this case, the neighbor node d3 may start the transmission of the frame Fn in the second guard interval GG2 between the frame F(n−1) and the frame Fn.

Figure 12:
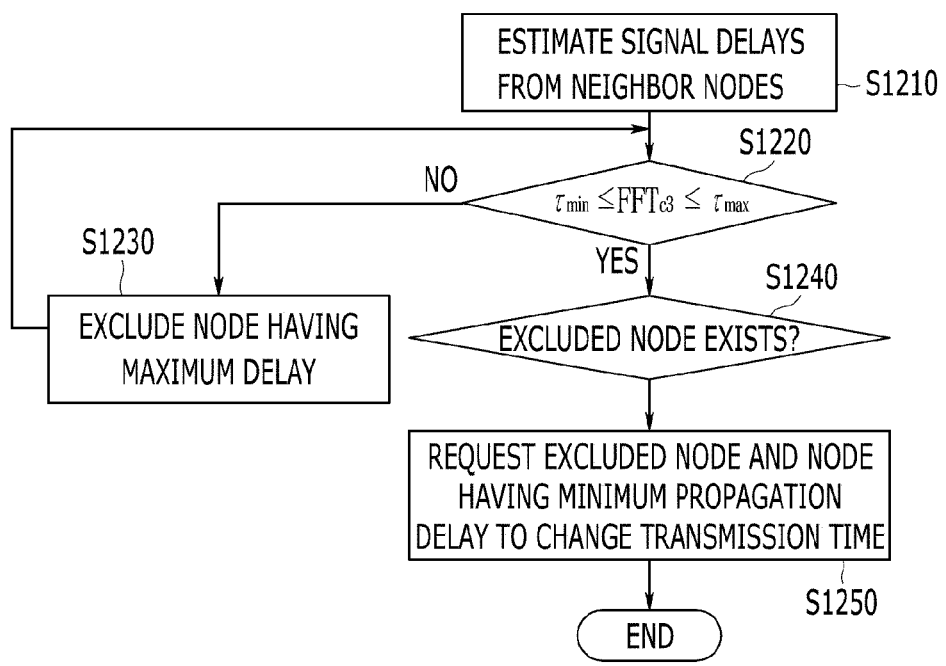
FIG. 12 is a flowchart illustrating a synchronization method in a wireless network system according to a second exemplary embodiment of the present invention.

FIG. 12 is a flowchart illustrating a synchronization method in a wireless network system according to a second exemplary embodiment of the present invention.

Referring to FIG. 12, the node c3 estimates propagation delays $\tau_{c2}$, $\tau_{b3}$, $\tau_{d3}$, and $\tau_{c4}$ between the node c3 and the neighbor nodes c2, b3, c4, and d3 (S1210), and then checks whether the condition of Equation 2 is satisfied (S1220).

When the condition of Equation 2 is satisfied, the node c3 determines whether an excluded node is present (S1240). When an excluded node is not present, the node c3 may set the FFT start point $FFT_{c3}$ to a value closest to an FFT start reference point between the maximum propagation delay $\tau_{max}$ and the minimum propagation delay $\tau_{min}$.

As described above, the FFT start reference point of the node c3 may be predetermined, and the initial value of the FFT start reference point of the node c3 may be determined by the system initial parameter.

When the FFT start point $FFT_{c3}$ that does not satisfy the condition of Equation 2 is not present, the node c3 excludes the neighbor node d3 having the maximum propagation delay $\tau_{max}$ (S1230), and checks whether an FFT start point $FFT_{c3}$ that satisfies the condition of Equation 2 is present (S1220). Alternatively, the node c3 may exclude the neighbor node having the minimum propagation delay $\tau_{min}$ and check whether a, FFT start point $FFT_{c3}$ that satisfies the condition of Equation 2 is present. Otherwise, the node c3 may exclude both the neighbor node d3 having the maximum propagation delay $\tau_{max}$ and the neighbor node having the maximum propagation delay $\tau_{min}$ and confirm whether a, FFT start point $FFT_{c3}$ that satisfies the condition of Equation 2 is present.

When the neighbor node d3 having the maximum propagation delay $\tau_{max}$ is excluded (S1240), the propagation delay $\tau_{c2}$ of the neighbor node c2 becomes a maximum value. The node c3 repeats the operation of checking whether a, FFT start point that satisfies the condition of Equation 2 is present while excluding a neighbor node having a maximum propagation delay until the condition of Equation 2 is satisfied.

When the condition of Equation 2 is satisfied, the node c3 requests an excluded neighbor node to advance or delay its transmission time reference point, and requests the neighbor node b3 having the minimum propagation delay $\tau_{min}$ among nodes that have not been excluded to delay its transmission time reference point (S1250).

For example, when only the neighbor node d3 is excluded and the conditions of Equations 1 and 2 are satisfied, the node c3 requests the neighbor node d3 to advance or delay its transmission time reference point, and requests the neighbor node b3 having the minimum propagation delay $\tau_{min}$ to delay its transmission time reference point.

When the neighbor node b3 having the minimum propagation delay $\tau_{min}$ is excluded in step S1230, the propagation delay $\tau_{c4}$ becomes a minimum value, and the node c3 checks whether an FFT start point $FFT_{c3}$ that satisfies the condition of Equation 2 is present upon exclusion of the neighbor node b3 having the minimum propagation delay $\tau_{min}$. In this manner, the node c3 repeats the operation of checking whether an FFT start point $FFT_{c3}$ that satisfies the condition of Equation 2 is present while excluding a neighbor node having a minimum propagation delay until the condition of Equation 2 is satisfied.

When the conditions of Equations 1 and 2 are satisfied, the node c3 may request an excluded neighbor node to advance or delay its transmission time reference point (S1250), and request the neighbor node d3 having the minimum propagation delay among nodes that have not been excluded to advance its transmission time reference point.

When both the neighbor node d3 having the maximum propagation delay $\tau_{max}$ and the neighbor node b3 having the minimum propagation delay $\tau_{min}$ are excluded in step S1230, the propagation delay $\tau_{c4}$ of the neighbor node c4 becomes a minimum value and the propagation delay $\tau_{c2}$ of the neighbor node c2 becomes a maximum value. In this state, the node c3 repeats the operation of excluding a neighbor node having a maximum propagation delay and a neighbor node having a minimum propagation delay while checking whether the condition of Equation 2 is satisfied.

When the condition of Equation 2 is satisfied, the node c3 may request an excluded neighbor node to advance or delay its transmission time reference point (S1250).

In this manner, in the synchronization method according to the second exemplary embodiment of the present invention, the node c3 can request two or more neighbor nodes, that is, the neighbor nodes d3 and b3, to change their transmission times, distinguished from the first exemplary embodiment shown in FIG. 6.

In addition, the neighbor nodes d3 and b3 requested to change their transmission time may reject the transmission time change request, as in the first exemplary embodiment, and in this case, the node c3 may measure interference and forcibly instruct the neighbor nodes to change their transmission time.

Figure 13:
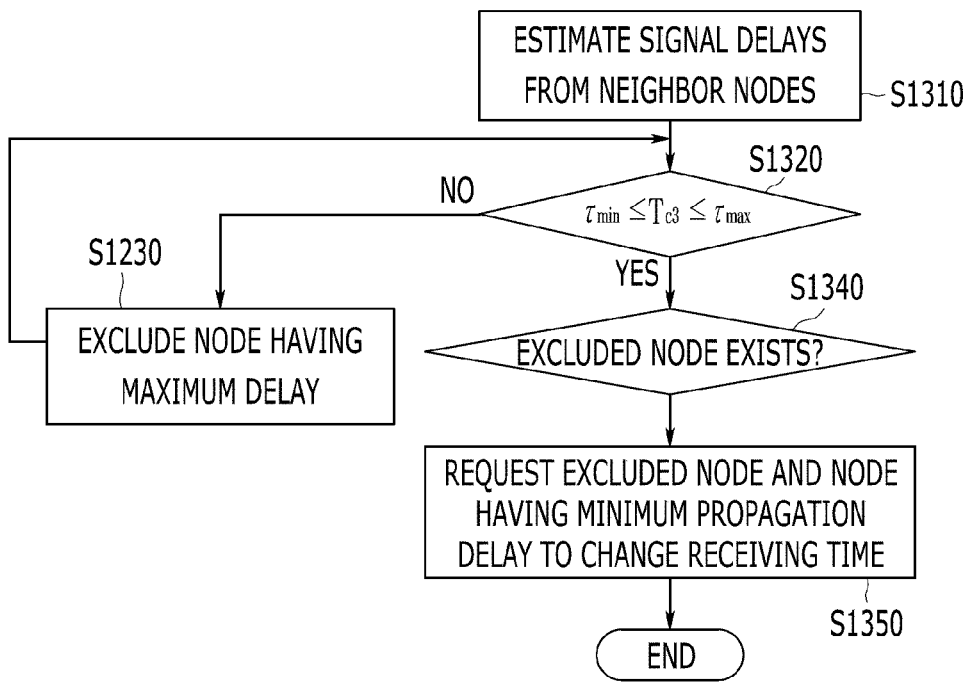
FIG. 13 is a flowchart illustrating a synchronization method in a wireless network system according to a third exemplary embodiment of the present invention.

FIG. 13 is a flowchart illustrating a synchronization method in a wireless network system according to a third exemplary embodiment of the present invention.

Referring to FIG. 13, when the neighbor nodes c2, b3, c4, and d3 need to receive a signal from the node c3 with no interference or insignificant interference, it is necessary to satisfy the condition of Equation 1.

The node c3 estimates the propagation delays $\tau_{c2}$, $\tau_{b3}$, $\tau_{d3}$, and $\tau_{c4}$ from the neighbor nodes c2, b3, c4, and d3 (S1310), and then checks whether the condition of Equation 3 is satisfied (S1320).

When the condition of the Equation 1 is satisfied, Equation 3 can be established.

$$\tau_{min} \leq T_{c3} \leq \tau_{max} \qquad \text{[Equation 3]}$$

Here, $\tau_{c3}$ represents the transmission start point of the node c3.

When the condition of Equation 3 is satisfied, the node c3 determines whether an excluded node is present (S1240). When no excluded node is present, the node c3 may set the transmission start point $T_{c3}$ to a value closest to the transmissions start reference point between the minimum propagation delay $\tau_{min}$ and the maximum propagation delay $\tau_{max}$. At this time, the transmission start reference point of the node c3 may be predetermined, and the initial value of the transmission start reference point of the node c3 may be determined by the system initial parameter.

When no transmission start point $\tau_{c3}$ that satisfies the condition of Equation 3 is present, the node d3 excludes the neighbor node d3 having the maximum propagation delay $\tau_{max}$ (S1330), and checks whether a transmission start point $T_{c3}$ that satisfies the condition of Equation 3 is present (1320). Alternatively, the node c3 may exclude the neighbor node b3 having the minimum propagation delay $\tau_{min}$ and check whether a transmission start point $T_{c3}$ that satisfies the condition of Equation 3 is present. In addition, the node c3 may exclude both the neighbor node d3 having the maximum propagation delay $\tau_{max}$ and the neighbor node b3 having the minimum propagation delay $\tau_{min}$ and check whether a transmission start point $T_{c3}$ that satisfies the condition of Equation 3 is present.

When the neighbor node d3 having the maximum propagation delay $\tau_{max}$ is excluded, the propagation delay $\tau_{c2}$ between the node c3 and the neighbor node c2 becomes a maximum value. In this state, the node c3 checks whether a transmission start point $T_{c3}$ is present between the minimum propagation delay and the maximum propagation delay.

The node c3 repeats the operation of checking whether the condition of Equation 3 is satisfied while excluding a neighbor node having a maximum propagation delay until the condition of Equation 3 is satisfied.

When the condition of Equation 3 is satisfied, the node c3 requests an excluded node to advance or delay its receiving time, that is, an FFT start reference point, and requests a neighbor node having a minimum propagation delay among non-excluded nodes to delay its FFT start reference point (S1350).

In addition, the node c3 may set the transmission start point $T_{c3}$ to a minimum propagation delay.

For example, when the condition of Equation 3 is satisfied after only the neighbor node d3 is excluded, the node c3 can request the neighbor node d3 to advance or delay its receiving time reference point, that is, its FFT start reference point, and simultaneously, request the neighbor node b3 having the minimum propagation delay to delay its FFT start reference point.

When the neighbor node b3 having the minimum propagation value $\tau_{min}$ is excluded in step S1330 (S1340), the propagation delay $\tau_{c4}$ of the neighbor node c4 becomes a minimum value, and the node c3 excludes the neighbor node b3 having the minimum propagation delay $\tau_{min}$ and checks whether a transmission start point $T_{c3}$ that satisfies the condition of Equation 3 is present.

In this way, the node c3 repeats the operation of checking whether the condition of Equation 3 is satisfied while excluding a neighbor node having a minimum propagation delay until the condition of Equation 3 is satisfied.

When the conditions of Equations 1 and 3 are satisfied, the node c3 may request an excluded node to advance or delay its FFT start reference point, and request the neighbor node d3 having the maximum propagation delay $\tau_{max}$ among non-excluded nodes to advance its FFT start reference point.

When both the neighbor node d3 having the maximum propagation delay $\tau_{max}$ and the neighbor node b3 having the minimum propagation delay $\tau_{min}$ are excluded in step S1230 (S1340), the propagation delay $\tau_{c4}$ of the neighbor node c4 becomes a minimum value and the propagation delay $\tau_{c2}$ of the neighbor node c2 becomes a maximum value. The node c3 repeats the operation of excluding a neighbor node having a minimum propagation delay and a neighbor node having a maximum propagation delay while checking whether the condition of Equation 3 is satisfied.

When the condition of Equation 3 is satisfied, the node c3 may request an excluded node to advance or delay its FFT start reference point (S1350).

The above-described synchronization method is an example of synchronization using information of one hop. For example, in the case where the node c3 knows information of a one-hop neighbor node of the neighbor node b2, for example, propagation delay, and the node b3 rejects a change request because of the neighbor node b2, if the neighbor node c2 changes its transmission time and thus the neighbor node b2 is not affected by the change of the neighbor node b3, the node c3 may simultaneously request the neighbor nodes b3 and c2 to change their transmission time. Accordingly, a basic procedure can be optimized depending on the number of hops corresponding to information of neighbor nodes, which is known by the node c3.

This synchronization method can be performed by not only the node c3 that enters the network but also by a node having a specific cycle for synchronization of the network.

Figure 14:
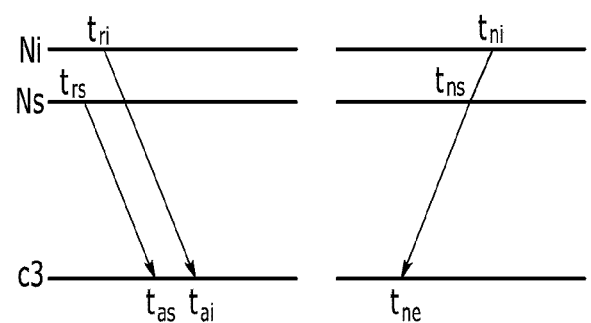
FIG. 14 illustrates a method of estimating a signal delay value through a ranging process according to an exemplary embodiment of the present invention.

FIG. 14 illustrates a method of estimating a signal delay through a ranging procedure according to an exemplary embodiment of the present invention.

In FIG. 14, Ns denotes a sponsor node that administrates the node c3, and Ni denotes one-hop nodes of the node c3, for example, neighbor nodes c2, b3, c4, and d3.

Fundamentally, reference time $t_{rf}$ is set to a time when the node c3 initially enters the network ($t_{rf}=0$), and all nodes in the network synchronize frame start points with the reference time ($t_{rf}=0$). Then, all the nodes transmit frames prior to or later than the reference time $t_{rf}$ according to the above-described synchronization method.

Referring to FIG. 14, the node Ns transmits a message at a changed time $t_{rs}$ rather than at the reference time $t_{rf}$. The message includes a difference $\Delta t_{rs}=t_{rs}-t_{rf}$ between the changed time $t_{rs}$ and the reference time $t_{rf}$.

A node Ni also transmits a message at a changed time $t_{ri}$ instead of the reference time $t_{rf}$ according to a distributed synchronization method. The message includes a difference $\Delta t_{ri}=t_{ri}-t_{rf}$ between the changed time $t_{ri}$ and the reference time $t_{rf}$.

Here, the value $\Delta t_{ri}=t_{ri}-t_{rf}$ needs to satisfy the condition of Equation 4.

$$-T_{D_{max}} \leq \Delta t_{ri} \leq T_{CP} \quad \text{[Equation 4]}$$

Here, $$T_{D_{max}} = \frac{D_0}{3 \times 10^8},$$

and $D_0$ is a maximum distance between one-hop nodes, which corresponds to a system parameter.

The node c3 estimates a receiving start time $t_{as}$ of the message transmitted from the node Ns. The node c3 may estimate the receiving start point $t_{as}$ through a preamble of the message transmitted from the node Ns.

In the same manner, the node c3 estimates a receiving start point $t_{ai}$ of the message transmitted from the node Ni through a preamble of the message.

The node c3 estimates and sets a transmission start point $t_{ne}$ from the receiving start point $t_{as}$ and transmits a ranging code to the nodes Ns and Ni at the transmission start point $t_{ne}$.

The node Ns estimates a ranging code receiving start point $t_{ns}$ through the ranging code transmitted at the transmission start point $t_{ne}$ and transmits the receiving start point $t_{ns}$ to the node c3.

The node Ni also estimates a ranging code receiving start point $t_{ni}$ through the ranging code transmitted at the transmission start point $t_{ne}$ and transmits the receiving start point $t_{ni}$ to the node c3.

The node c3 estimates a time round trip delay (RTD) between the node c3 and each of the nodes Ns and Ni using the receiving start points $t_{ns}$ and $t_{ni}$ received from the nodes Ns and Ni.

The RTD between the node c3 and the node Ns may correspond to Equation 5, and the RTD between node c3 and the node Ni may correspond to Equation 6.

$$RTD_{c3\_ns} = t_{ns} \quad \text{[Equation 5]}$$

$$RTD_{c3\_ni} = t_{ni} + \Delta t_{ais} - (\Delta t_{ri} - \Delta t_{rs}) \quad \text{[Equation 6]}$$

Here, $\Delta t_{ais}$ denotes a difference between the receiving start point $t_{ai}$ and the receiving start point $t_{as}$.

The node c3 may obtain delay $\tau$ between the node c3 and the node Ni using delay $RTD_{c3\_ni}$ between the node c3 and the node Ni. The delay $\tau_{ni}$ between the node c3 and the node Ni is represented by Equation 7.

$$\tau_{ni} = t_{ri} + (RTD_{c3\_ni}/2) \quad \text{[Equation 7]}$$

The ranging procedure in the synchronization methods according to the first and second exemplary embodiments of the present invention may be changed to a periodic ranging procedure depending on a node or topology variation.

Figure 15:
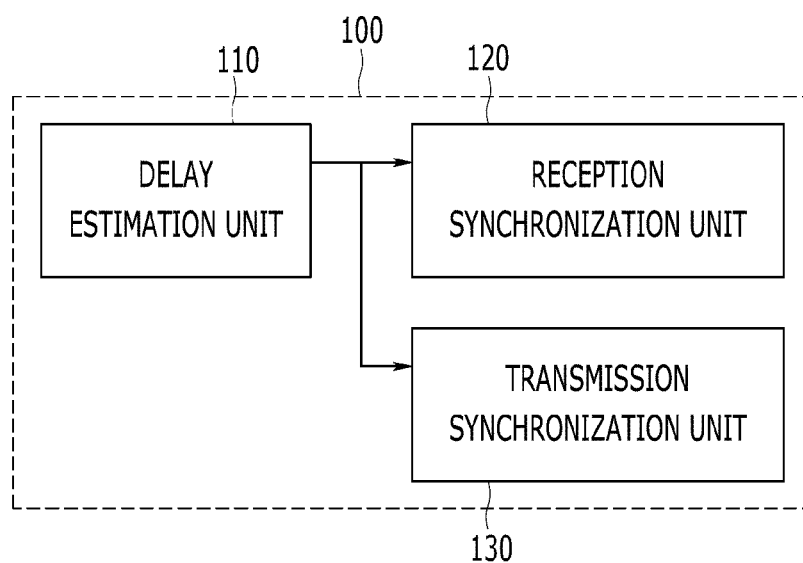
FIG. 15 is a block diagram of a synchronization apparatus according to an exemplary embodiment of the present invention.

FIG. 15 is a block diagram of a synchronization apparatus 100 according to an exemplary embodiment of the present invention.

Referring to FIG. 15, the synchronization apparatus 100 includes a delay estimation unit 110, a reception synchronization unit 120, and a transmission synchronization unit 130.

The delay estimation unit 110 estimates propagation delays between the synchronization apparatus and a plurality of neighbor nodes corresponding to one hop of the synchronization apparatus. The propagation delays may be estimated through a ranging procedure, as described above.

The reception synchronization unit 120 sets an FFT start point such that it satisfies the condition of Equation 2, determines a neighbor node having a transmission time to be changed from among the plurality of neighbor nodes corresponding to one hop of the synchronization apparatus using the propagation delays of the neighbor nodes, and requests the determined neighbor node to change its signal transmission time.

The reception synchronization unit 120 measures interference for a predetermined time when the neighbor node rejects the transmission time change request, and forcibly instructs the neighbor node to change its signal transmission time when the measured interference exceeds a reference value.

The transmission synchronization unit 130 sets a signal transmission time such that it satisfies the condition of Equation 3, determines a neighbor node having a signal receiving time to be changed from among the plurality of neighbor nodes corresponding to one hop of the synchronization apparatus using the propagation delays of the neighbor nodes, and requests the determined neighbor node to change its signal receiving time.

According to an exemplary embodiment of the present invention, a distributed synchronization method is established in consideration of a propagation delay and mobility depending on a distance between nodes in a wireless network system such as mesh or ad-hoc network. This distributed synchronization method can be applied to OFDM or OFDMA, and estimates and corrects synchronization of nodes through a control signal.

Exemplary embodiments of the present invention are not implemented only through the above-described apparatus and/or method, and may be implemented through a program executing functions corresponding to configurations of the exemplary embodiments of the present invention or a recording medium storing the program. This implementation will be easily accomplished by those skilled in the art from the description of the above-mentioned exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for synchronizing receiving time of a node in a wireless network system node, the method comprising:
    estimating propagation delays between the node and a plurality of neighbor nodes corresponding to one hop of the node; and
    requesting at least one of a neighbor node having a minimum propagation delay and a neighbor node having a maximum propagation delay to change its signal transmission time.

2. The method of claim 1, wherein the requesting of the at least one neighbor node comprises requesting the at least one neighbor node to change its signal transmission time when a difference between the maximum propagation delay and the minimum propagation delay is greater than the length of a cycle prefix (CP) of one symbol.

3. The method of claim 1, wherein the requesting of the at least one neighbor node comprises requesting the neighbor node having the minimum propagation delay to delay its signal transmission time.

4. The method of claim 1, wherein the requesting of the at least one neighbor node comprises requesting the neighbor node having the maximum propagation delay to advance its signal transmission time.

5. The method of claim 1, wherein the requesting of the at least one neighbor node comprises requesting the neighbor node having the minimum propagation delay to delay its signal transmission time, and requesting the neighbor node having the maximum propagation delay to advance its signal transmission time.

6. The method of claim 1, wherein the requesting of the at least one neighbor node comprises:
    checking whether a fast Fourier transform (FFT) start point is present within a range between the maximum propagation delay and the minimum propagation delay;
    excluding the at least one of a neighbor node having a minimum propagation delay and a neighbor node having a maximum propagation delay from among the plurality of neighbor nodes until the FFT start point is present within the range between the maximum propagation delay and the minimum propagation delay when the FFT start point is not present; and
    requesting the excluded neighbor node to change its signal transmission time.

7. The method of claim 6, wherein the requesting of the at least one neighbor node further comprises setting the FFT start point to a value closest to an FFT start reference point between the maximum propagation delay and the minimum propagation delay when the FFT start point is present within the range between the maximum propagation delay and the minimum propagation delay.

8. The method of claim 6, wherein the requesting of the at least one neighbor node further comprises setting the FFT start point to the minimum propagation delay when the FFT start point is not present within the range between the maximum propagation delay and the minimum propagation delay.

9. The method of claim 1, further comprising:
    measuring the amount of interference for a predetermined time when the at least one neighbor node rejects the transmission time change request; and
    forcibly instructing the at least one neighbor node to change its signal transmission time when the measured amount of interference exceeds a predetermined reference value.

10. The method of claim 1, wherein the estimating of the propagation delays comprises calculating round trip delays between the specific node and the plurality of neighbor nodes through a ranging procedure with the plurality of neighbor nodes, and estimating the propagation delays from the round trip delays.

11. A method for synchronizing transmission time of a node in a wireless network system, the method comprising:
    estimating propagation delays between the node and a plurality of neighbor nodes corresponding to one hop of the node; and
    requesting at least one of a neighbor node having a minimum propagation delay and a neighbor node having a maximum propagation delay to change its signal receiving time.

12. The method of claim 11, wherein the requesting of the at least one neighbor node comprises requesting the neighbor node having the minimum propagation delay to delay its signal receiving time, and requesting the neighbor node having the maximum propagation delay to advance its signal receiving time.

13. The method of claim 11, wherein the requesting of the at least one neighbor node comprises:
    checking whether a transmission start point is present within a range between the maximum propagation delay and the minimum propagation delay;
    excluding at least one of a neighbor node having a minimum propagation delay and a neighbor node having a maximum propagation delay from among the plurality of neighbor nodes until the transmission start point is present within the range between the maximum propagation delay and the minimum propagation delay when the FFT start point is not present; and
    requesting an excluded neighbor node to change its signal receiving time.

14. The method of claim 13, wherein the requesting of the at least one neighbor node further comprises setting the transmission start point to a value closest to a transmission start reference point between the maximum propagation delay and the minimum propagation delay when the transmission start point is present within the range between the maximum propagation delay and the minimum propagation delay.

15. The method of claim 13, wherein the requesting of the at least one neighbor node further comprises setting the transmission start point to the minimum propagation delay when the transmission start point is not present within the range between the maximum propagation delay and the minimum propagation delay.

16. An apparatus for synchronizing nodes in a wireless network system, the apparatus comprising:

a delay estimation unit configured to estimate propagation delays between the node and a plurality of neighbor nodes corresponding to one hop of the node;

a reception synchronization unit configured to request at least one of a neighbor node having a minimum propagation delay and a neighbor node having a maximum propagation delay to change its signal transmission time using the propagation delays of the plurality of neighbor nodes; and a transmission synchronization unit configured to request at least one of a neighbor node having a minimum propagation delay and a neighbor node having a maximum propagation delay to change its signal receiving time using the propagation delays of the plurality of neighbor nodes.

17. The apparatus of claim 16, wherein the reception synchronization unit excludes at least one of a neighbor node having a minimum propagation delay and a neighbor node having a maximum propagation delay until an FFT start point is present within the range between the maximum propagation delay and the minimum propagation delay when the FFT start point is not present within the range between the maximum propagation delay and the minimum propagation delay, and requests an excluded neighbor node to change its signal transmission time.

18. The apparatus of claim 17, wherein the reception synchronization unit measures the amount of interference for a predetermined time when the at least one neighbor node rejects the transmission time change request, and forcibly instructs the at least one neighbor node to change its signal transmission time when the measured amount of interference exceeds a predetermined reference value.

19. The apparatus of claim 17, wherein the reception synchronization unit sets the FFT start point to a value closest to a predetermined FFT start reference point between the maximum propagation delay and the minimum propagation delay when the FFT start point is present within the range between the maximum propagation delay and the minimum propagation delay, and sets the FFT start point to the minimum propagation delay when the FFT start point is not present within the range between the maximum propagation delay and the minimum propagation delay.

20. The apparatus of claim 16, wherein the transmission synchronization unit excludes at least one of a neighbor node having a minimum propagation delay and a neighbor node having a maximum propagation delay until a transmission start point is present within the range between the maximum propagation delay and the minimum propagation delay when the transmission start point is not present within the range between the maximum propagation delay and the minimum propagation delay, and requests an excluded neighbor node to change its signal receiving time.

* * * * *